United States Patent [19]
Thorson et al.

[11] Patent Number: 6,085,303
[45] Date of Patent: Jul. 4, 2000

[54] SERALIZED RACE-FREE VIRTUAL BARRIER NETWORK

[75] Inventors: Greg Thorson, Altoona; Randal S. Passint, Chippewa Falls; Steven L. Scott, Eau Claire, all of Wis.

[73] Assignee: Cray Research, Inc., Eagan, Minn.

[21] Appl. No.: 08/972,010

[22] Filed: Nov. 17, 1997

[51] Int. Cl.$^7$ ................................................. G06F 15/16
[52] U.S. Cl. .................................................. 712/16; 709/3
[58] Field of Search ............................. 395/553; 712/16; 709/400, 3, 4

[56] References Cited

U.S. PATENT DOCUMENTS

| | | | |
|---|---|---|---|
| Re. 28,577 | 10/1975 | Schmidt | 179/15 |
| 4,330,858 | 5/1982 | Choquet | 370/111 |
| 4,630,259 | 12/1986 | Larson et al. | 370/60 |
| 4,771,391 | 9/1988 | Blasbalg | 364/514 |
| 4,811,214 | 3/1989 | Nosenchuck et al. | 364/200 |
| 4,868,818 | 9/1989 | Madan et al. | 371/11 |
| 4,933,933 | 6/1990 | Dally et al. | 370/60 |
| 4,974,143 | 11/1990 | Yamada | 364/200 |
| 4,980,822 | 12/1990 | Brantley et al. | 364/200 |
| 4,987,537 | 1/1991 | Kawata | 364/200 |
| 5,008,882 | 4/1991 | Peterson et al. | 370/943 |
| 5,031,211 | 7/1991 | Nagai et al. | 379/221 |
| 5,036,459 | 7/1991 | Den Haan et al. | 364/200 |
| 5,081,623 | 1/1992 | Ainscow | 370/85.4 |
| 5,083,265 | 1/1992 | Valiant | 395/800.21 |

(List continued on next page.)

FOREIGN PATENT DOCUMENTS

0570729A2  4/1993  European Pat. Off. .

OTHER PUBLICATIONS

International Search Report for International Application No. PCT/IE 95/00047; Date of Completion—Dec. 22, 1995; Authorized Officer—R. Salm.

"IEEE Standard for Scalable Coherent Interface (SCI)", *IEEE Std 1596–1992*, 1–248, (Mar., 1992).

"International Search Report for International Application No. PCT/US 95/15483", *Date of completion—Apr. 24, 1996; Authorized Officer—P. Schenkels.*

Dally & H. Aoki, W.J., "Deadlock–Free Adaptive Routing in Multicomputer Networks using Virtual Channels", *I.E.E.E. Transactions on Parrallel and Distributed Systems*, vol. 4, No. , at 466–475, Apr. 1993.

(List continued on next page.)

*Primary Examiner*—Eric Coleman
*Attorney, Agent, or Firm*—Schwegman, Lundberg, Woessner & Kluth P.A.

[57] ABSTRACT

Improved method and apparatus for facilitating barrier and eureka synchronization in a massively parallel processing system. The present barrier/eureka synchronization mechanism provides a partitionable, low-latency, immediately reusable, robust mechanism which can operate on a physical data-communications network and can be used to alert all processor entities (PEs) in a partition when all of the PEs in that partition have reached a designated barrier point in their individual program code, or when any one of the PEs in that partition has reached a designated eureka point in its individual program code, or when either the barrier or eureka requirements have been satisfied, which ever comes first. Multiple overlapping synchronization partitions are available simultaneously through the use of a plurality of parallel synchronization contexts. The present synchronization mechanism may be implemented on either a dedicated barrier network, or superimposed as a virtual barrier/eureka network operating on a physical data-communications network which is also used for data interchange, operating system functions, and other purposes. The present barrier/ eureka mechanism also supports zero to N processor entities at each router node ("leaves" on the barrier tree), and provides a barrier sequence counter for each barrier context in order to resolve potential race conflicts that might otherwise arise.

34 Claims, 10 Drawing Sheets

U.S. PATENT DOCUMENTS

| | | | |
|---|---|---|---|
| 5,105,424 | 4/1992 | Flaig et al. | 370/941 |
| 5,117,350 | 5/1992 | Parrish et al. | 395/425 |
| 5,134,690 | 7/1992 | Samatham | 395/200 |
| 5,157,692 | 10/1992 | Horie et al. | 375/38 |
| 5,161,156 | 11/1992 | Baum et al. | 371/7 |
| 5,170,482 | 12/1992 | Shu et al. | 395/800 |
| 5,175,733 | 12/1992 | Nugent | 370/94 |
| 5,195,100 | 3/1993 | Katz et al. | 371/66 |
| 5,201,044 | 4/1993 | Frey, Jr. et al. | 395/575 |
| 5,210,705 | 5/1993 | Chauvel et al. | 364/572 |
| 5,218,601 | 6/1993 | Chujo et al. | 370/16 |
| 5,218,676 | 6/1993 | Ben-ayed et al. | 395/200 |
| 5,233,618 | 8/1993 | Glider et al. | 371/68.1 |
| 5,239,545 | 8/1993 | Buchholz | 370/95.3 |
| 5,274,799 | 12/1993 | Brant et al. | 395/575 |
| 5,276,899 | 1/1994 | Neches | 395/800 |
| 5,280,474 | 1/1994 | Nickolls et al. | 370/60 |
| 5,297,137 | 3/1994 | Ofek et al. | 370/60 |
| 5,303,244 | 4/1994 | Watson | 371/10.1 |
| 5,313,628 | 5/1994 | Mendelsohn et al. | 395/575 |
| 5,313,645 | 5/1994 | Rolfe | 395/800 |
| 5,331,631 | 7/1994 | Teraslinna | 370/60 |
| 5,333,279 | 7/1994 | Dunning | 395/325 |
| 5,341,504 | 8/1994 | Mori et al. | 395/800 |
| 5,345,565 | 9/1994 | Jibbe et al. | 395/325 |
| 5,347,450 | 9/1994 | Nugent | 395/200 |
| 5,353,283 | 10/1994 | Tsuchiya | 370/60 |
| 5,365,228 | 11/1994 | Childs et al. | 340/825.8 |
| 5,383,191 | 1/1995 | Hobgood et al. | 371/112 |
| 5,390,164 | 2/1995 | Kremer | 370/16 |
| 5,394,528 | 2/1995 | Kobayashi et al. | 395/325 |
| 5,402,428 | 3/1995 | Kakuta et al. | 371/10.1 |
| 5,434,495 | 7/1995 | Oberlin | 395/553 |
| 5,434,846 | 7/1995 | Themel et al. | 30/13 |
| 5,434,995 | 7/1995 | Oberlin et al. | 395/550 |
| 5,440,547 | 8/1995 | Easki | 370/60 |
| 5,444,701 | 8/1995 | Cypher et al. | 370/60 |
| 5,452,444 | 9/1995 | Solomon et al. | 395/182.04 |
| 5,453,978 | 9/1995 | Sethu et al. | 370/60 |
| 5,475,858 | 12/1995 | Gupta et al. | 395/800 |
| 5,499,337 | 3/1996 | Gordon | 395/182.04 |
| 5,513,192 | 4/1996 | Janku et al. | 371/50.1 |
| 5,517,497 | 5/1996 | LeBoudec et al. | 370/60.1 |
| 5,519,844 | 5/1996 | Stallmo | 395/441 |
| 5,522,031 | 5/1996 | Ellis et al. | 395/182.04 |
| 5,530,948 | 6/1996 | Islam | 395/182.04 |
| 5,533,198 | 7/1996 | Thorson | 395/200.15 |
| 5,546,549 | 8/1996 | Barrett et al. | 395/309 |
| 5,546,596 | 8/1996 | Geist | 395/200.02 |
| 5,548,639 | 8/1996 | Ogura et al. | 379/221 |
| 5,550,589 | 8/1996 | Shiorjiri et al. | 348/387 |
| 5,555,542 | 9/1996 | Ogura et al. | 370/94.1 |
| 5,583,990 | 12/1996 | Birrittella et al. | 395/200.01 |
| 5,590,284 | 12/1996 | Crosetto | 395/200.05 |
| 5,596,742 | 1/1997 | Agarwal et al. | 395/500 |
| 5,627,986 | 5/1997 | Frankland | 395/402 |
| 5,659,796 | 8/1997 | Thorson et al. | 395/200.71 |
| 5,721,819 | 2/1998 | Galles et al. | 395/200.15 |
| 5,721,921 | 2/1998 | Kessler et al. | 395/672 |
| 5,790,776 | 8/1998 | Sonnier | 395/189.08 |
| 5,793,962 | 8/1998 | Badovinatz | 395/200.31 |

OTHER PUBLICATIONS

Galles, M., "Spider: A High–Speed Network Interconnect", *IEEE Micro*, 34–39, (Jan./Feb. 1997).

Gustavson, D.B., "The Scalable Coherent Interface and related Standards Projects", *IEEE Micro*, 10–22, (Feb., 1992).

Laudon, J., et al., "The SGI Origin: A ccNUMA Highly Scalable Server", *ISCA*, 1–11, (1997).

Ni, L.M., et al., "A Survey of Wormhold Routing Techniques in Direct Networks", *Computer*, pp. 62–75, (1993).

Patterson, D.A., et al., "A Case For Redundant Arrays Of Inexpensive Disks (RAID)", *University of California at Berkeley, Report No. UCB/CSD 87/391*, (Dec. 1987).

Scott, S., "The SCX Channel: A New, Supercomputer–Class System Interconnect", *HOT Interconnects III*, Abstract, pp. 1–11, (Aug. 1–11, 1995).

Snyder, L., "Introduction to the Configurable, Highly Parallel Computer", *IEEE*, pp. 47—56, (Jan. 1982).

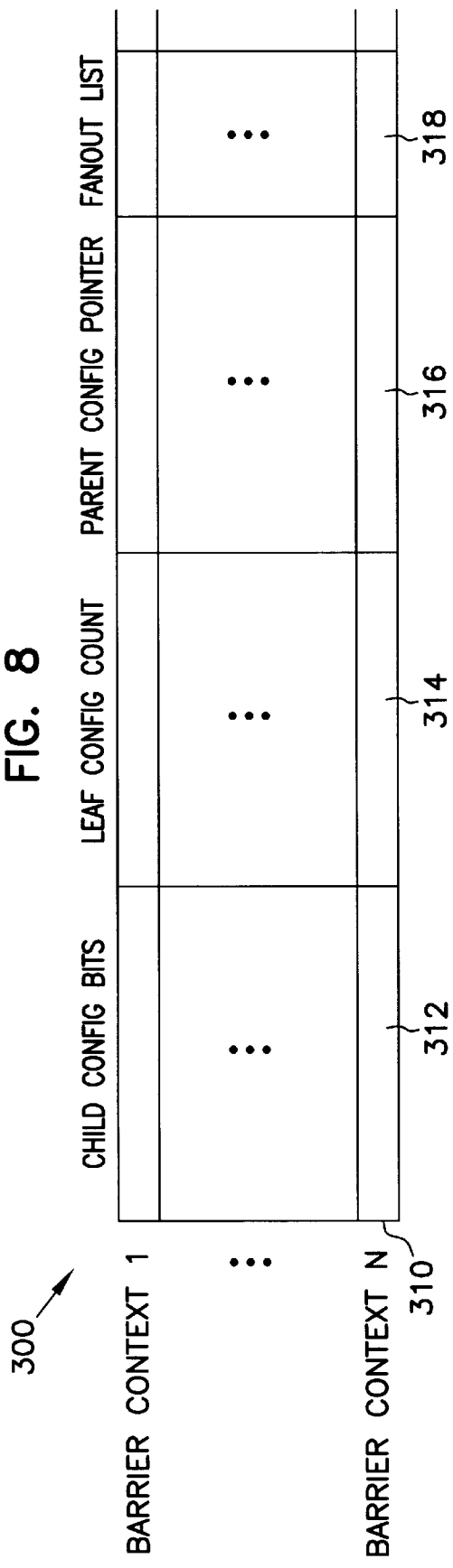
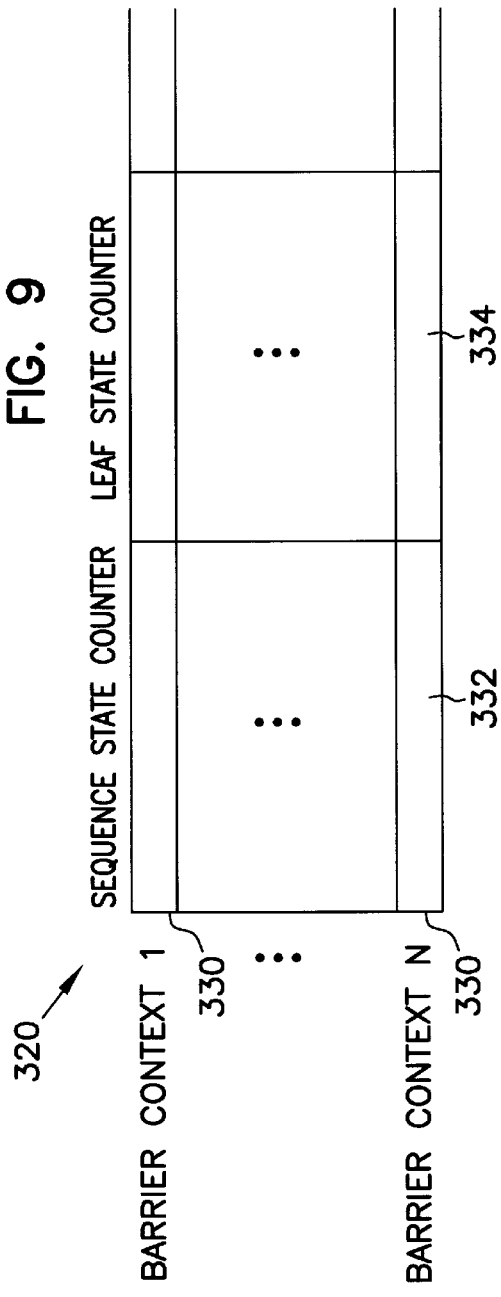

SERALIZED RACE-FREE VIRTUAL BARRIER NETWORK

CROSS-REFERENCES TO RELATED INVENTIONS

This invention is related to U.S. Pat. No. 5,434,995 issued Jul. 18, 1995 and to application Ser. No. 08/450,251 now U.S. Pat. No. 5,721,921 filed May 25, 1995, each of which are hereby incorporated by reference.

FIELD OF THE INVENTION

The present invention relates to methods and apparatus for parallel multiprocessor systems and more specifically to synchronization of processes running on multiprocessor systems.

BACKGROUND OF THE INVENTION

Massively parallel processing (MPP) systems are computing systems comprised of hundreds or thousands of processing elements (PEs). While the power of a multiple-instruction multiple-data (MIMD) MPP computer system lies in its ability to execute independent threads of code simultaneously, the inherently asynchronous states of the PEs (with respect to each other) makes it difficult in such a system to enforce a deterministic order of events when necessary. Program sequences involving interaction between multiple PEs such as coordinated communication, sequential access to shared resources, controlled transitions between parallel regions, etc., may require synchronization of the PEs in order to assure proper execution.

Very fast synchronization is required for high-performance highly parallel processing with asynchronous processors (i.e., processors which execute programs independently of each other). This synchronization involves communication among the computational entities which work together on an overall application program. An important synchronization capability in any programming model is the "barrier". Barriers are points placed in the code beyond which no processor participating in a particular computation is to be allowed to proceed until all processors have arrived at their respective barrier points. Since PEs may wait at a barrier until alerted that all PEs have arrived at the barrier, it is very important to minimize the latency of the barrier mechanism. The latency of a barrier mechanism is defined as the period of time between when the last processor arrives at a barrier, and when all processors have been notified that the requirements of the barrier have been satisfied (the term for meeting these requirements is also called "satisfying the barrier"). During this period of time, all PEs may be idle waiting for the barrier to be satisfied. Hence barriers can be used as a serialization point in a parallel code (a point from which all PEs can proceed ahead, having waited for other PEs to be synchronized). Because a barrier defines a serialization point in a program, it is important to keep the barrier latency as low as possible, in order that the work to be done after the barrier can be started as soon as possible.

Another important synchronization capability in any programming model is the "eureka". Eureka are points placed in the code which notify all other processors of a particular group of processors participating in a computation that one processor has reached that eureka point in its computation. Typically, the eureka point is a notification that the processor has reached a solution to the computation (e.g., found the item being searched for by the group). Since processors will typically abandon the work they are doing upon being notified that another PE has arrived at its eureka point, it is also very important to minimize the latency of the eureka mechanism. The latency of a eureka mechanism is defined as the period of time between when the first processor arrives at a eureka, and when all processors have been notified that the eureka has been satisfied. During this period of time, all other PEs may be doing fruitless computation even though the eureka has been satisfied. As soon as the other PEs have been notified that the eureka has been satisfied, they can proceed to the next stage of their computation. Hence eurekas can also be used as a serialization point in a parallel code. Because a eureka defines a serialization point in a program, it is important to keep the eureka latency as low as possible.

Barriers and eurekas can be implemented entirely by software means, but software schemes are typically encumbered by long latencies and/or limited parallelism restricting how many processors can arrive at the barrier simultaneously without artificial serialization (e.g., atomic test-and-set or read-modify-write type operations which impose serialization by software convention or style).

Hardware support for barriers and eurekas, while reducing the latency problems associated with barriers and eurekas implemented by purely software means, can have other shortcomings that limit the utility of the mechanism in a production computing system. (Production computing systems, which support many users and often have less controlled environments than do more theoretical test-bed computing systems, demand that the barrier resource and eureka resource—like all resources—be partitionable among multiple users while maintaining protective boundaries between users.) In addition, the barrier resource and eureka resource must have functions which are rich enough to allow isolation between the operating system and the user executing within the same partition. Provision must also be made for fault tolerance to insure the robust nature of the barrier and eureka mechanism.

Hardware mechanisms may also suffer from an inability to operate synchronously. This inability may require that a PE, upon discovering that a barrier has been satisfied (all PEs have arrived at that barrier point in the program) or that a eureka has been satisfied (one PE has arrived at that eureka point in the program), wait until all PEs have discovered that the barrier or eureka has been reached before it may proceed through the next section of program code. The ability to operate synchronously enables the barrier mechanism and eureka mechanism to be immediately reusable without fear of race conditions (e.g., where, due to timing variances, some PEs cannot determine whether the barrier is being "armed" (initialized), has been armed, or has been satisfied).

Hardware mechanisms may also require that a PE explicitly test a barrier flag or eureka flag to discover when the respective condition has been satisfied. This can prevent a PE from accomplishing other useful work while the barrier remains unsatisfied, or force the programmer to include periodic tests of the barrier and eureka into the program in order to accomplish other useful work while a barrier or eureka is pending. This can limit the usefulness of a eureka mechanism when used as a means of terminating speculative parallel work (e.g., a database search) when the work has been completed (e.g. the searched-for item has been found).

Hardware mechanisms may require that the overall barrier tree be hardwired in a rigid configuration. While sub-portions of the barrier tree may be used for separate barrier networks, there is often little flexibility to configure various barrier trees.

It is often desirable to allocate some, but not all, of the processors in a parallel processing network to some particular application (software) program, and to use the other remaining processors for some other program. This allocation can change over time. It is thus desirable to have a subset of all processors in a parallel-processing network participating in a barrier and/or eureka synchronization, and to be able to dynamically change the configuration over time.

SUMMARY OF THE INVENTION

The present invention provides a method and apparatus that facilitates highly functional barrier and eureka synchronization in a massively parallel processing system. Race problems are addressed by providing a sequence number for each barrier context, in order to allow determination of the state of each barrier context. Resolving the state of the barrier context is important when swapping tasks or jobs in the parallel processor network. The present barrier/eureka mechanism provides a partitionable, low-latency, immediately reusable, robust mechanism which can operate on a physical data-communications network and can be used to alert all PEs in a partition of the fact that all of the PEs in that partition have reached a designated barrier point in their individual program code, or when any one of the PEs in that partition has reached a designated eureka point in its individual program code, or when either the barrier or eureka requirements have been satisfied, which ever comes first. Multiple overlapping barrier/eureka synchronization contexts are available simultaneously. At each node, a plurality of child-nodes, as well as a plurality of processor leaves corresponding to that node, are supported. Race-resolution logic and a state machine resolve potential race conditions.

In various embodiments, the present invention provides a computer system, a node router, and/or a method for solving race problems in barrier synchronization.

In one embodiment, a computer system includes a plurality of routers, including a first router. The routers are connected into a communications network, wherein the communications network connects to each one of the plurality of routers. A synchronization domain is coupled to the communications network. Typically, a synchronization domain provides all of the synchronization functions for the network, and includes a plurality of synchronization contexts, and each synchronization context can be partitioned into a plurality of synchronization trees. The synchronization domain includes one or more barrier contexts and a synchronization messaging apparatus and, for each one of the plurality of routers, a synchronization state register. The synchronization messaging apparatus sends and receives synchronization messages across the communications network between pairs of the plurality of routers, wherein the synchronization messages include a barrier-join message (also called a "fanin" message) and a barrier-complete message (also called a "fanout" message). The synchronization state register for the first router stores an indication of one of a plurality of synchronization states and a sequence value that is changed upon a changing of a synchronization state.

In one such embodiment, the computer system is according the above description, and the synchronization domain further includes a first portion of the synchronization domain for the first router, the first portion of the synchronization domain including: a first plurality of node interconnection ports for the first router, wherein the first plurality of node interconnection ports is operable to connect the first router to a plurality of other routers; a synchronization-child-connection (SCC) register coupled to the first plurality of node interconnection ports, wherein the SCC register specifies which ones of the plurality of routers are children of the first node router; and a synchronization parent connection (SPC) register coupled to the first plurality of node interconnection ports, wherein the SPC register specifies which one of the plurality of routers is a parent of the first router.

In another such embodiment, the synchronization messages further comprise a eureka message.

In yet another such embodiment, the computer system further includes a first synchronization state changer coupled to the synchronization state register and to the synchronization messaging circuit of the first router, and responsive to a synchronization state stored in the first synchronization state register and to a synchronization message received by the first synchronization messaging circuit, to change a synchronization state and a sequence value.

In one embodiment, a node is provided for use in a multiprocessor network. The node includes a router, a plurality of processor entities (PEs) coupled to the router, and a synchronization configuration register (SCR). The router has a plurality of ports. The SCR includes an indication of which of the ports if any are connected to child nodes, an indication of which of the ports if any is connected to a parent node, and an indication of which of, or how many of, the PEs are connected as leaves of a barrier tree. In one such embodiment, a synchronization state register (SCR) is also provided. The SSR includes an indication of a barrier sequence state, the barrier sequence state changing when a barrier completes or starts or both. In one such embodiment, the SCR further includes an indication of which of (or how many of) the PEs connected as leaves of a barrier tree have completed a barrier.

BRIEF DESCRIPTION OF THE DRAWINGS

FIG. 8 shows one embodiment of barrier configuration register 300.

FIG. 9 shows one embodiment of barrier state register 320.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
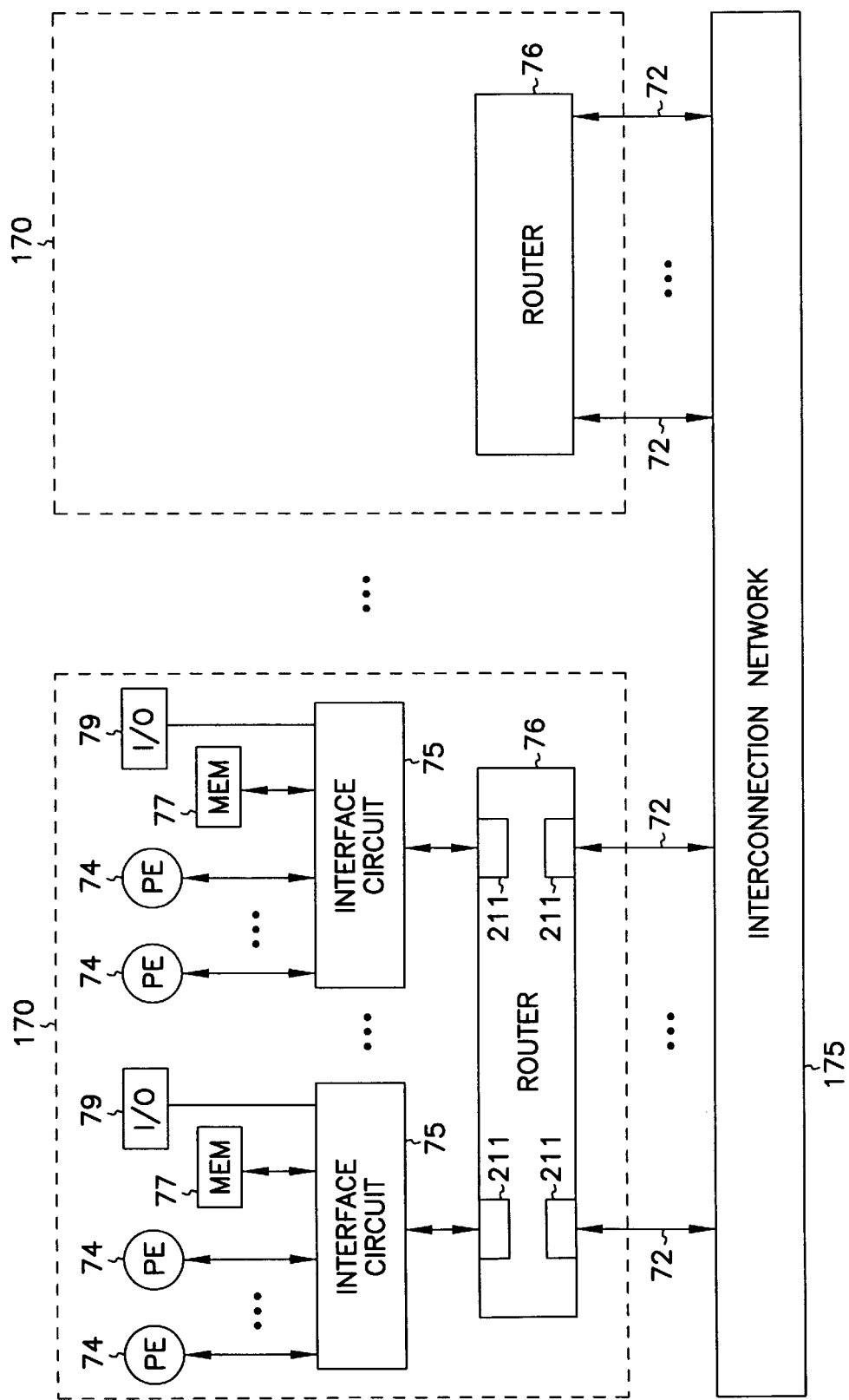
FIG. 1 shows one embodiment of network 100 of the present invention.

FIG. 1 shows one embodiment of network 100 of the present invention having one or more router nodes 170, each router node 170 having zero to N processors 74, zero to M memories 77, and zero to I input/output (I/O) subsystems 79. Depending on the needs of a user, interconnection network 175 can be set up as a three-dimensional torus, an N-dimensional hypercube, or any other suitable interconnection network between router nodes 76. In one embodiment, each router 76 includes eight ports 211, wherein each post 211 can be used to either connect to other routers 76, or to one to N processor elements (PEs) 74. Thus, in some embodiments, a router can be used as just an interconnection node in the network 175, having no PEs 74 or memory 77 or I/O subsystems 79, and all of its ports are used to connect to other routers 76.

Figure 2:
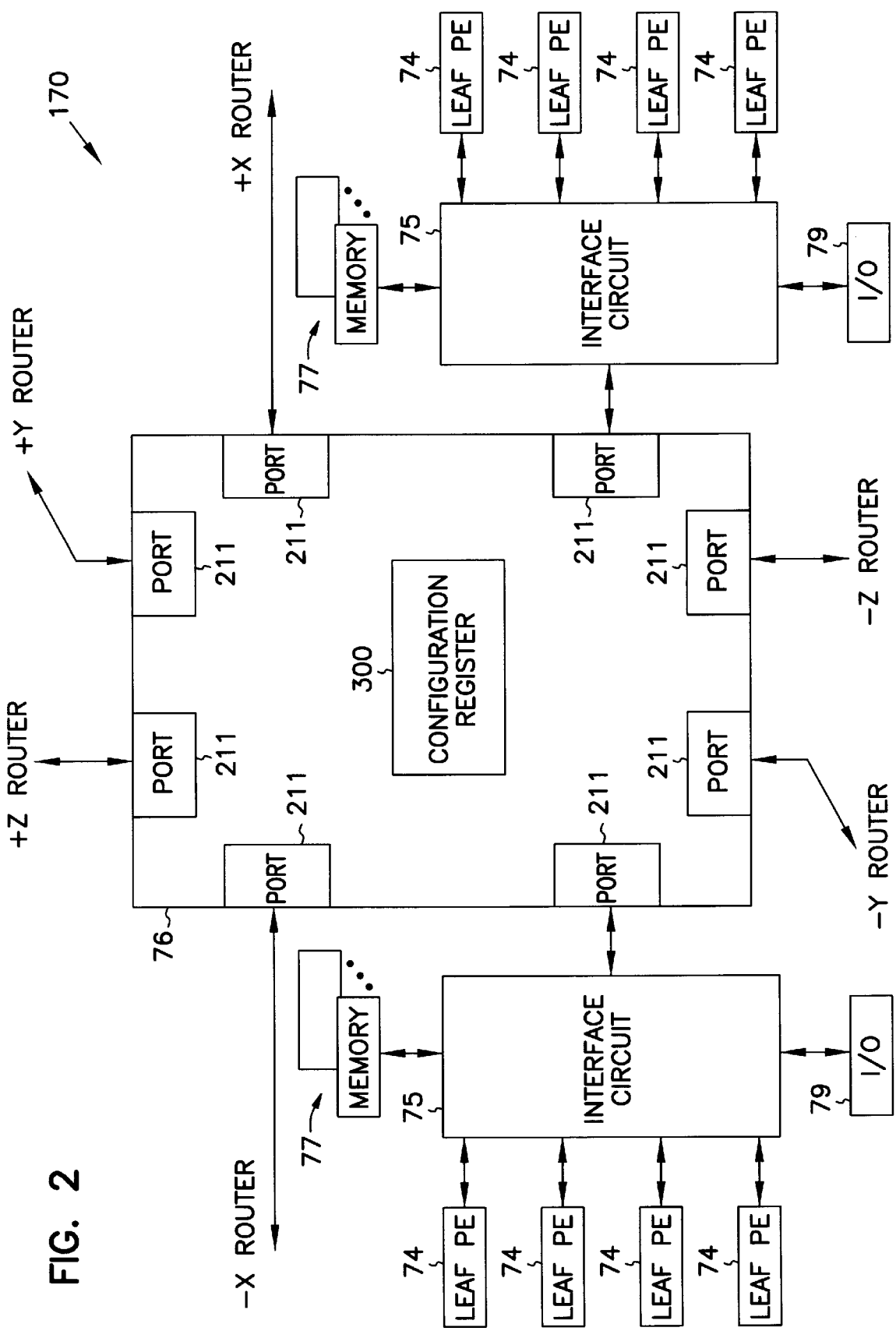
FIG. 2 shows one embodiment of a router node 170 having a router 76 with six router connections 72 and eight processors 74.

In other embodiments, such as shown in FIG. 1, some of the ports 211 are used to connect to other routers 76 through network 175, and other ports 211 are used to connect, via interface circuit 75, to PEs 74, memories 77, and I/O subsystems 79. FIG. 2 shows details of one such embodiment of a router node 170 having a router 76 with six router connections 72 and eight processor elements 74. One to four PEs 74 connect to each interface circuit 75, and share a single memory 77 having one or more banks of memory. Each interface circuit 75 optionally connects to an I/O subsystem 79 that provides connections to conventional high-speed I/O ports and devices such as workstations, disk systems, and tape systems, etc. When such a router node 170 is connected in a barrier tree, the processors local to that node are called "leaf PEs" 74.

Note, as used herein, a barrier tree, also called herein a synchronization tree, can be used for barrier-type synchronization (wherein all participating PEs must reach a barrier before continuing; and the barrier or synchronization is "complete" once all processors reach the barrier) or eureka-type synchronization (wherein any one of the participating PEs must reach a barrier before all can stop current processing and continue with post-synchronization processing; and the eureka or synchronization is "complete" once any processor reaches the barrier), or both. Unless specifically noted otherwise by the context of the description herein, a barrier tree includes a tree that is used for either barriers or eurekas or both, and does not limit to only barriers nor require both barriers and eurekas to be implemented. Also, the term "barrier-eureka synchronization" is meant to include synchronization at barriers or eurekas or both, and should not be construed to require both barriers and eurekas.

Figure 3:
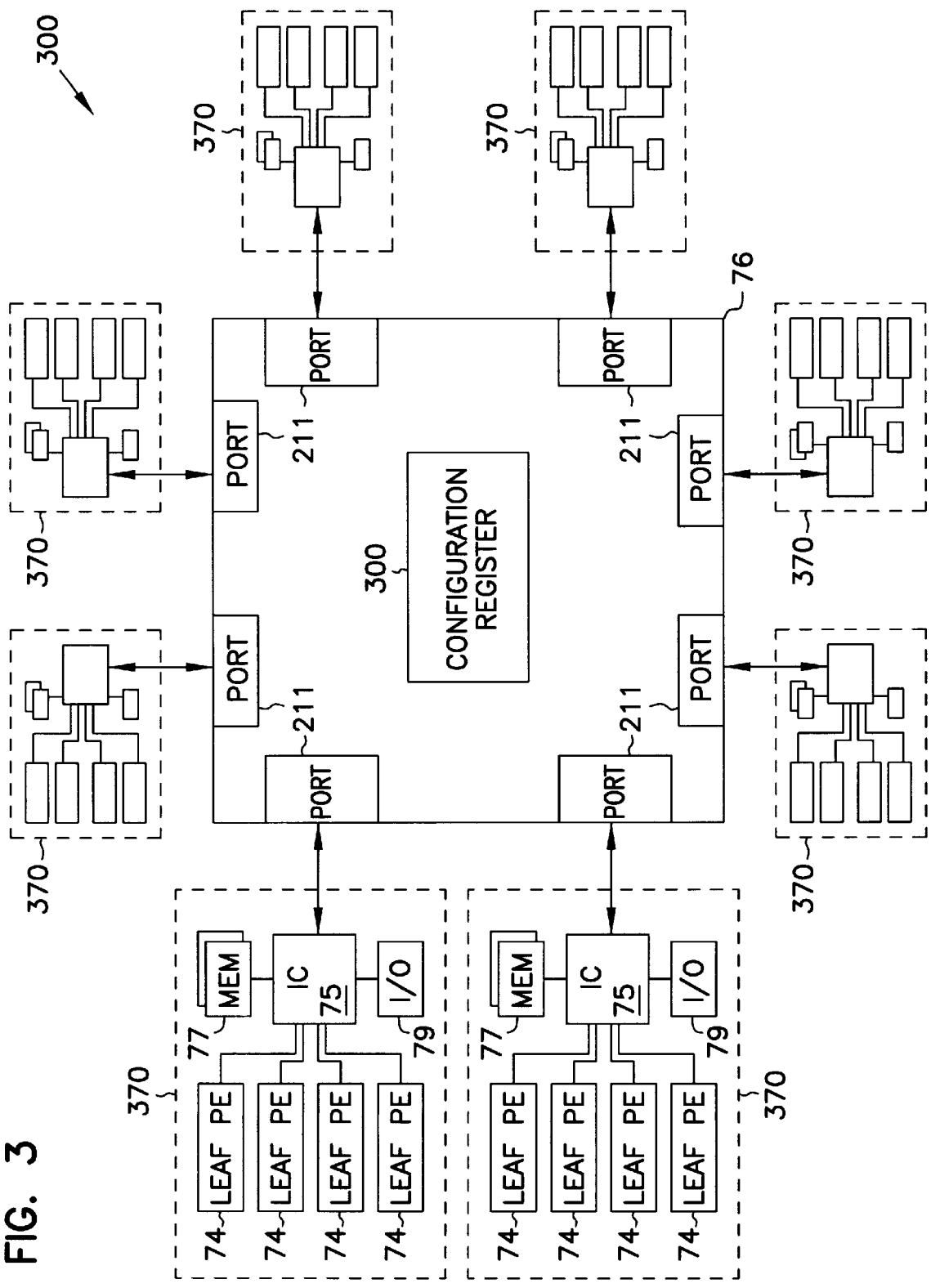
FIG. 3 shows another embodiment of a router node 170 having a router 76 with no router connections 72 and thirty-two processors 74.

FIG. 3 shows another embodiment of a router node 170 having a router 76 with no router connections 72 and thirty-two processors 74. This is the maximum number of leaf PEs 74 for this embodiment of router 76 (which has 8 ports 211) and interface circuit 75 (which can connect to up to four PEs 74). Each port 211 connects to up to one processor cluster 370, and each processor cluster 370 has up to four PEs 74, a shared memory 77 for the PEs 74, and a shared I/O subsystem 79, all connected through one interface circuit 75. In this embodiment, router 76 is not connected to any other router 76. Of course in other configurations, not all ports 211 need be used, and not all processor clusters 370 need be fully populated with four PEs 74.

Figure 4:
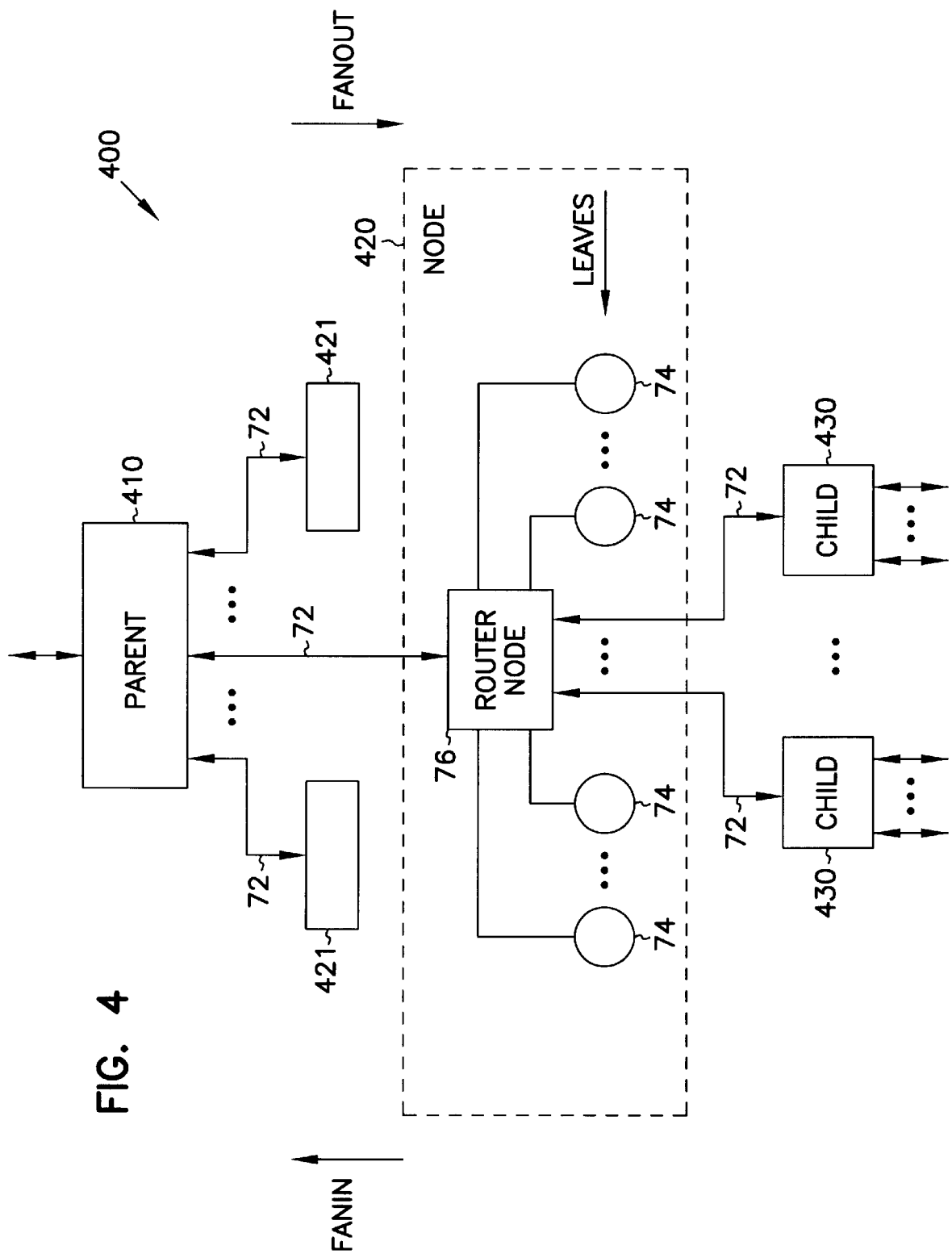
FIG. 4 shows a portion of a barrier tree 400.

FIG. 4 shows a portion of a barrier tree 400 having a node 420, parent 410, and a plurality of children 430. Each node 420 can simultaneously participate in up to 32 different barrier trees 400. As shown, each node 420 of a particular barrier tree 400 can have up to C children nodes 430 and up to L leaves 74, but only up to one parent node 410. Each child node 430 and each parent node 410 are otherwise identical to node 420. Parent node 410 can have other child nodes 421. The nodes of barrier tree 400 are connected through the regular interconnection network 175 using router connections 72. The topology of each barrier tree 400 is configured using configuration register 300 (see FIG. 3). A barrier is complete at a node 420 once all of the child nodes have reported barrier-complete though a fanin message and all of the leaf PEs 74 participating in that barrier have also reported barrier-complete through a memory-mapped write operation; once the barrier is complete at a node 420, a barrier-complete fanin message will be sent to the parent node 410. The ultimate parent node of a barrier tree 400 is called the root node. Once the barrier is complete through the root node (meaning that all PEs participating in that barrier have reported barrier-complete), a barrier-complete fanout message is sent by the root node to all PEs participating in that barrier.

Figure 5:
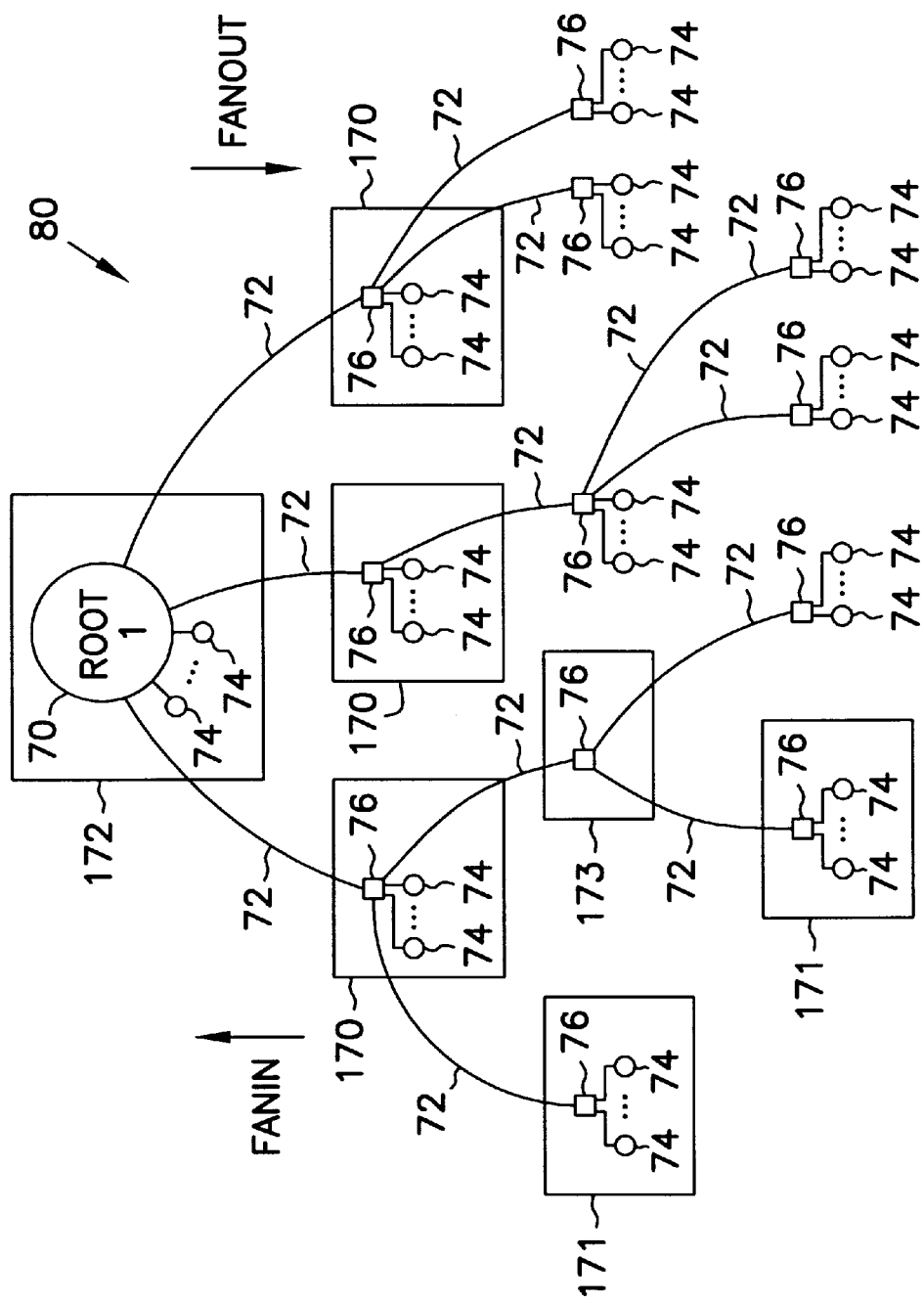
FIG. 5 shows a portion of a barrier tree 80 having nodes 170.

FIG. 5 shows a portion of a barrier tree 80 having nodes 170. The ultimate parent node 172 differs from other nodes 170 only in that it has no parent node connection, and thus contains the root router 70. The ultimate child nodes 171 differ from other nodes 170 only in that they have no children nodes for whom they are parents. In general, each node will have leaf PEs 74 which participate in the barrier, however, some nodes, such as node 173, have no leaf PEs but form interconnection points and gathering points for fanin messages from its children nodes and transmission points for fanout messages to its children nodes. Thus, each barrier node 170 can have zero or one parent node 410, zero to C child nodes 430, and zero to L leaf PEs 74 (see FIG. 4). There may be processor elements 74 that are connected to a particular router 76 but which do not participate in a particular barrier tree that exists on that router 76, and so those PEs not participating are not leaves on that barrier tree 80, but may be leaves for other barrier trees 80 using that router 76.

Figure 6:
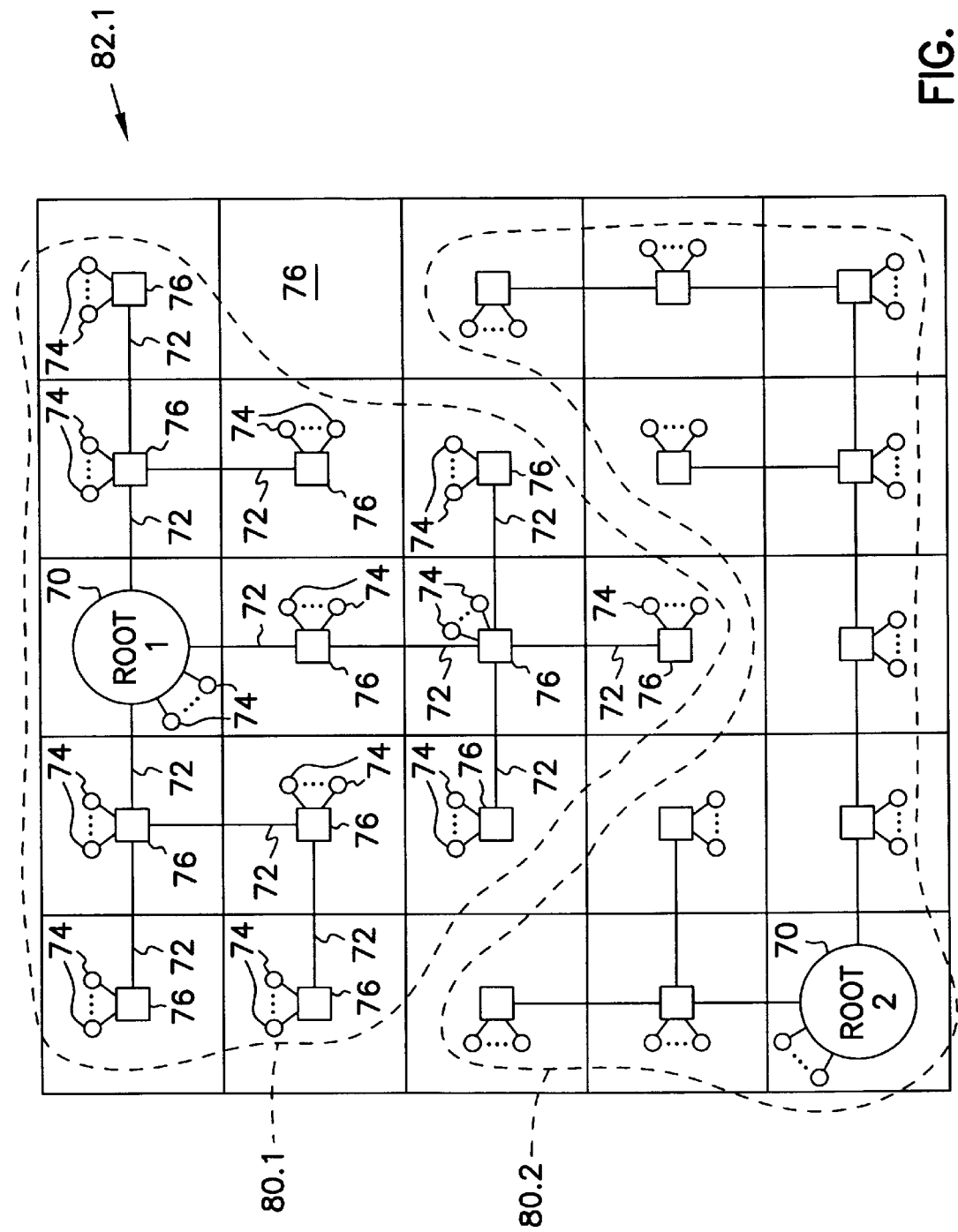
FIG. 6 shows a portion of a barrier context 82.1 that is used to service two barrier trees 80.1 and 80.2.

FIG. 6 shows a portion of a barrier context 82.1 that is used to service two barrier trees 80.1 and 80.2. A single context can only support one barrier tree 80 at a time at any one router, but the routers on a network can be partitioned so that a single context 82 can support a plurality of independent barrier trees 80 simultaneously.

Figure 7:
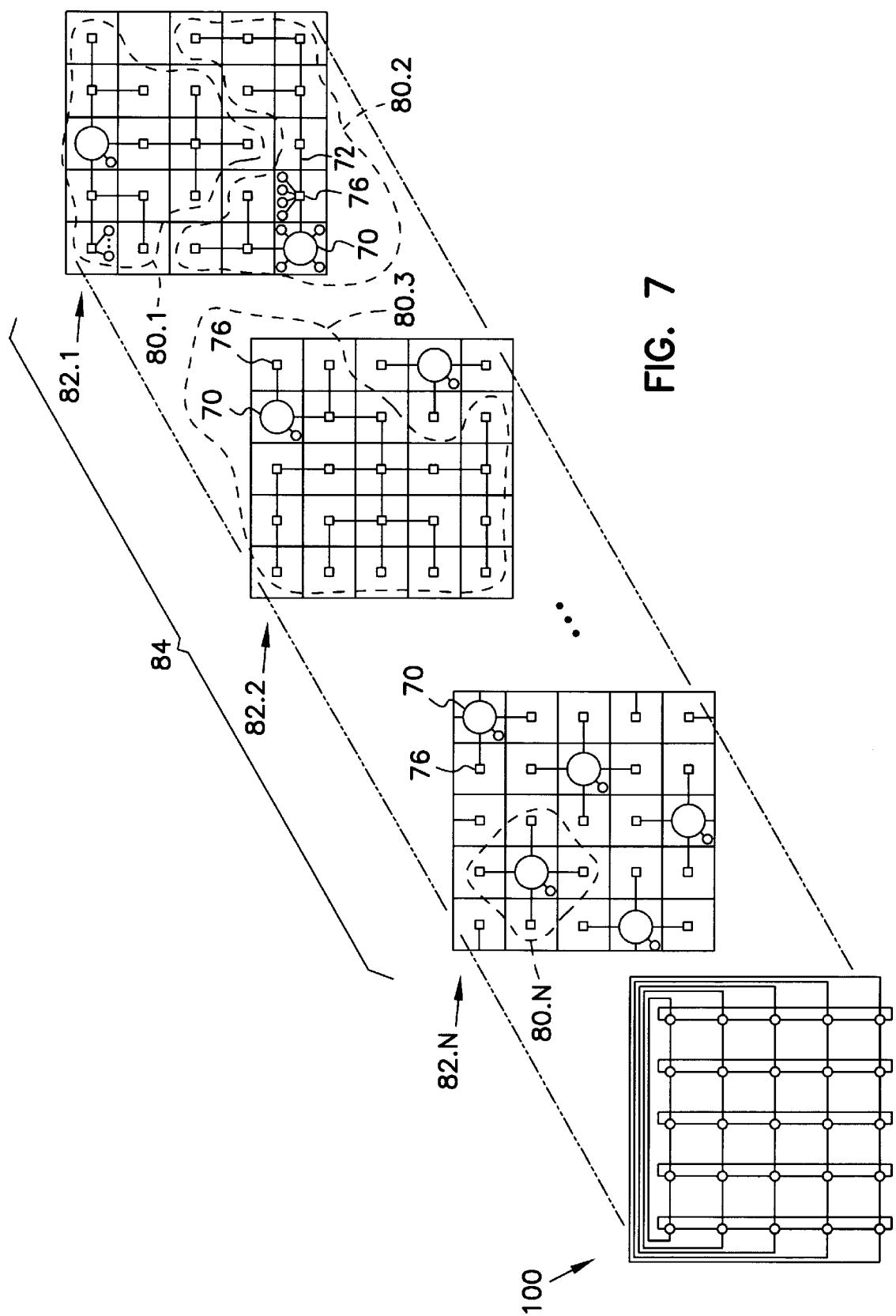
FIG. 7 shows a portion of a network 100 having a plurality of barrier contexts 82, each having one or more barrier trees 80.

In one embodiment, a plurality of contexts 82 are supported; and in one particular embodiment denoted SN1, thirty-two (32) contexts are supported. FIG. 7 shows a portion of a network 100 that supports a synchronization domain 84 having a plurality of barrier contexts 82, each supporting one or more barrier trees 80 (e.g., a barrier context can be configured to be unused, and thus have no barrier trees 80; or can be configured to be one large barrier tree 80 that includes every processor in the network 100; or can be configured to be many barrier trees 80 as small as a single router 76 that forms a tree that only includes locally attached leaf PEs 74). Together, this plurality of thirty-two synchronization contexts 82 form a synchronization domain 84 that is coupled to the communications network and uses the network to transmit synchronization messages between routers. Typically, a synchronization domain 84 provides all of the synchronization functions for the network, and includes a plurality of synchronization contexts 82, and each synchronization context 82 can be partitioned into a plurality of synchronization trees 80. FIG. 7 shows a five-by-five network 100 connected as a two-dimensional torus, supporting general interprocessor communications and parallel operations. The messages passed between routers 76 on network 100 include barrier messages which support virtual or dynamic barrier networks on the barrier contexts 82. That is, programs or tasks can swap the barriers as part of the program or task swap in a multitasking environment, unloading and loading barrier trees into the plurality of barrier contexts 82.1 through 82.N (in one embodiment, 32 barrier contexts are provided). Since each barrier context 82 can be partitioned into any arbitrary number of portions each supporting a separate independent barrier tree 80.1 through 80.N, a great amount versatility is provided.

In addition, each router 76 can support zero to N processor entities 74, and can serially reuse the resources of a particular barrier context 82 at that router 76. Since messages are used to pass barrier information between routers 76 and to leaf PEs 74, there is a certain amount of timing difference that must be handled by the system, particular when tasks are swapped. For example, at one router 76 and in a single barrier context 82 or barrier tree 80, all leaf PEs and child connections are "unset" when the barrier is initialized, and each is individually "set" when the barrier for that leaf PE is completed (i.e., upon "barrier completion") or a fanin message for that child connection is received. When all PEs for that barrier reach barrier completion, a fanout message is sent from the root node, which will place that barrier context back into the unset state for the subsequent barrier. Once in the unset state (e.g., they are unset at barrier 2), a leaf PE 74 will commence the next portion of programming, and may reach the next barrier (e.g., they are set at barrier 2) even before some of the other leaf PEs 74 have received their fanout message (e.g., they are still set at barrier 1). This race condition must be resolved when tasks are swapped, and perhaps at other times as well.

FIG. 8 shows one embodiment of barrier configuration register 300. A barrier configuration context section 310 is provided for each barrier context 82. Each barrier configuration context section 310 includes child-configuration bits 312 having one bit corresponding to each possible port 211 to which a child node could be connected to indicate which are connected to child nodes 430, leaf configuration count 314 having a count of the number of leaves that must complete a barrier at this node, and parent configuration pointer 316 that has a pointer or number that indicates which port is connected to the parent node 410 for this router node 420.

FIG. 9 shows one embodiment of barrier state register 320.

The SN1 router implementation of one embodiment of the present invention supports hardware-implemented barriers with the following characteristics:

A. Thirty-two (32) barrier contexts 82.
B. Barrier configuration register 300 includes eight (8) child-configuration bits 312 (a bit-significant indication, wherein a separate bit is provided for each port 211, and is a one if that port connects to a child node 430) plus six (6) leaf-configuration count bits 314 (a count of the number of PEs 74 connected to this router 76 that are participating in a barrier tree in this barrier context) plus four (4) parent-configuration pointer bits 316 per barrier context section 310 (each barrier context 82 has one barrier context section 310 of barrier configuration register 300). The six leaf configuration bits, in one embodiment, provide a count of the number of leaves that need to join a barrier in order to complete that barrier at that router (in addition to and child connections that must complete, wherein the minimum number of leaves is zero (0) (i.e., this router is a pass-through node or only accumulates barrier completion from one or more children router nodes), and the maximum number of leaves is thirty-two (32) (i.e., this is a simple network having a single router chip and 32 processors; all eight ports of the router chip are used for leaves, and each of the eight ports has four leaves (processors) for a total of 32 leaves, and no port is used to connect to another router, thus there are no children or parent connections). These 33 possible configurations require 6 bits as a count, and a 6-bit counter to record the state.

C. Two (2) sequence-state counter bits 332, plus six (6) leaf-state counter bits 334 per barrier state context section 330 (a count of between 0 to 32 inclusive), for the up to 32 leaves per router. The leaves 74 can poll the router 76 to determine whether the barrier has completed (thus changing the sequence state), and the router chip will return the low bit of the sequence state counter 332 for the leaf PE 74 to test).

D. Barrier messages have highest priority following message-in-progress (MIP)

E. Barrier fanout messages are broadcast to children at one per clock period (thus, for example when a root node has three child nodes, it would take three successive clock periods for a root node to send fanout messages to its three child nodes).

F. Priority is hardwired with 0 as highest, 31 as lowest.

G. Fanout broadcast on a given context must complete before starting any new fanin or fanout transmission.

H. Leaf access is via access to a memory mapped register operations (hub places special command in Cmd field) to leaf register and vector packet to configuration register.

I. Access to leaf registers is mapped to 1 of 4 leaf registers based on one bit of source and whether the reference came in an odd or even port (ports labeled A, C, E, G are the odd ports).

Configuration

Figure 10:
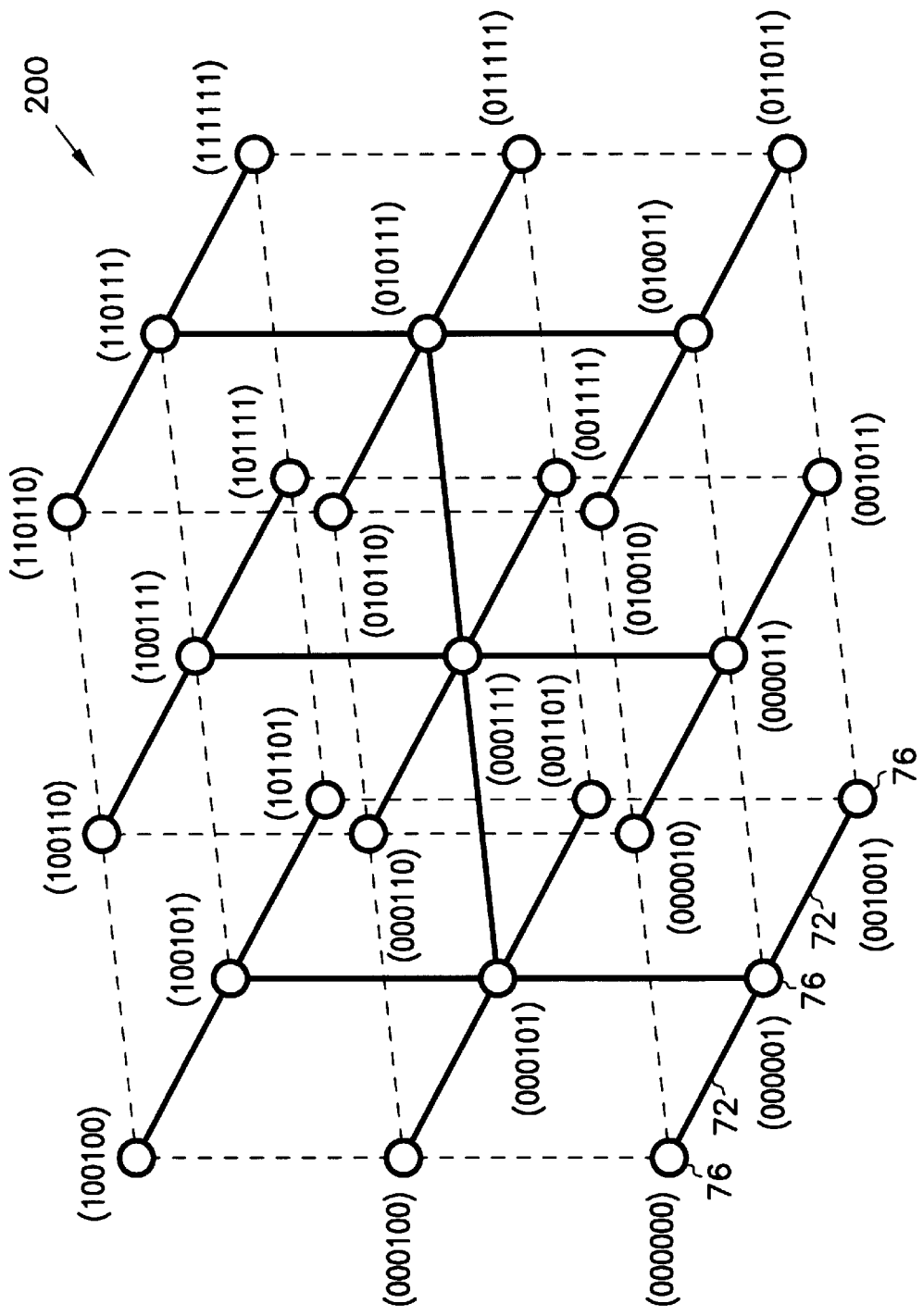
FIG. 10 shows one embodiment of a barrier tree implemented on a portion of a 3-D hypercube.
Figure 11:
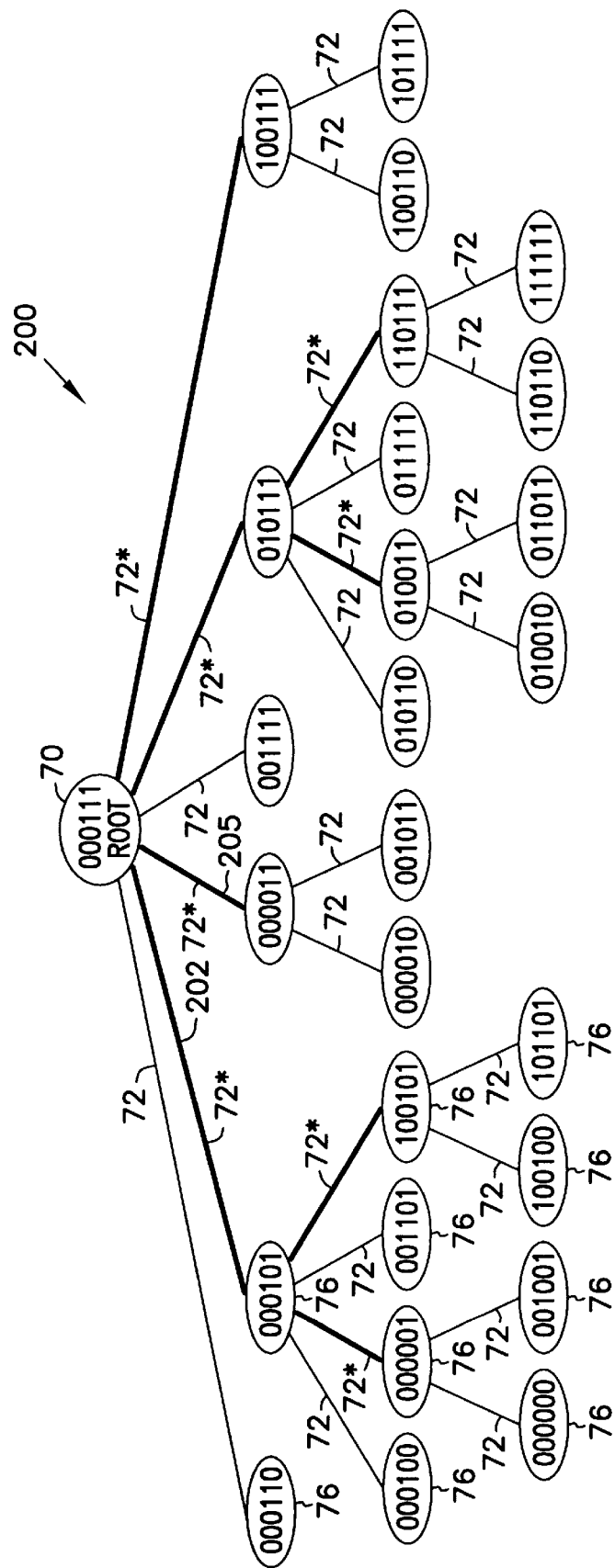
FIG. 11 shows the barrier tree of FIG. 10 in a more conventional schematic form.

As described in U.S. patent application Ser. No. 08/450,251 filed May 25, 1995 which is hereby incorporated by reference, (the T3E embodiment), barrier trees in one embodiment are constructed through nearest-neighbor connections. An example is shown in FIG. 10, which shows a portion (the portion having an array, the portion having 27 processing nodes in a 3-by-3-by-3 configuration) of a massively parallel processor. The dark lines 72 indicate the links that make up the barrier tree 200, with the root 70 of the tree in the center. A logical (i.e., unfolded) representation of this same tree 200 is shown in FIG. 11. In FIG. 11, the links that should be transmitted as early as possible are highlighted, i.e., because further links are serial to these. In this example, links 72* are prioritized, in order that they are sent earlier than other links 72 that are transmitted to ultimate child nodes 171. In one embodiment, router 76 includes, as part of synchronization configuration register 300, a fanout list 318 kept in priority order, of the child nodes to which a fanout message will be sent. The software used to configure the barrier tree determines the links that need priority, and loads the fanout list 318 of synchronization configuration register 300, with the prioritized list. By sending fanout messages on these highlighted links 72* first, the serialization-time penalty is minimized. For example, the fanout on link 202 would be prioritized to be sent before the fanout for link 205.

In one embodiment, this ordering is accomplished through a configuration register that indicates the order that the ports should transmit a fanout. One such embodiment uses a single bit to indicate the prioritized links 72* that are to be sent before non-prioritized links 72. The port connections of the present invention are set up via a configuration register that can be read and written. An example of such a configuration register 300 is shown in FIG. 8. In another embodiment, a separate leaf bit is provided for each leaf PE, i.e., the number of the ports are capable of supporting leaf operations, times the number of PEs per port (for example, four bits if two ports and two PEs per port, thus, up to four leaves total are provided per router node).

TABLE 1

Encoding of Barrier Parent Port Field

| Parent Port | Encoding (hexadecimal) |
| --- | --- |
| None (i.e., this is the root) | 0 |
| A | 1 |
| B | 2 |
| C | 3 |
| D | 4 |
| E | 5 |
| F | 6 |
| G | 7 |
| H | 8 |

TABLE 2

Encoding of Barrier Child Port Field Bits

| Child Port | ChildSel Bit |
| --- | --- |
| A | 0 |
| B | 1 |
| C | 2 |
| D | 3 |
| E | 4 |
| F | 5 |
| G | 6 |
| H | 7 |

TABLE 3

Assignment of Leaf Bits

| Port | Source Bit | LeafSel/ LeafState Bit |
| --- | --- | --- |
| A | 0 | 0 |
| A | 1 | 1 |
| B | 0 | 2 |
| B | 1 | 3 |

Operation

The barrier mechanism is controlled by several state machines as described in TABLE 4. The sequence field provides the capability to remove problems cause by race conditions from a swap of a barrier context. Upon swapping out a context, the software must determine the state of tree. In practice, the software only needs to determine which states that the leaves would have achieved, had enough time elapsed to quiesce the tree. The possible race condition problem is as follows. If some leaves are set and others cleared, then one of three conditions may exist:

1. the unset leaves have not yet joined a first barrier and thus the first barrier is not complete (no adjustment needed), or
2. all the leaves were set due to joining a first barrier, the unset leaves have subsequently been cleared by having received the fanout signal of the completed first barrier, and the set leaves have not yet received the fanout signal of the completed first barrier (set leaves from first barrier are reset, and their sequence numbers updated to reflect this barrier completion), or
3. all the leaves were set due to joining a first barrier, the unset leaves have subsequently been cleared by having received the fanout signal of the completed first barrier, and some of the set leaves have not yet received the fanout of the completed first barrier and some others of the set leaves received the fanout signal of the completed first barrier, were unset for some period of time, and were then set again when they joined a subsequent barrier (set leaves from first barrier are reset, and their sequence numbers updated to reflect this barrier completion).

If all leaves are set, then one of two conditions may exist:

1. all the leaves were set due to joining a first barrier, and have not yet received the fanout signal of the completed first barrier, or
2. all the leaves were set due to joining a first barrier, and some of the set leaves have not yet received the fanout of the completed first barrier and some others of the set leaves received the fanout signal of the completed first barrier, were unset for some period of time, and were then set again when they joined a subsequent barrier (set leaves from first barrier are reset, and their sequence numbers updated to reflect this barrier completion).

TABLE 4

Barrier State Machines

| Machine Name | Quantity | States | Description |
| --- | --- | --- | --- |
| Sequence | 1 per context | 4 | Written by OS write to config register. Incremented when fanout packet received by parent. |
| Leaf | 4 per context | 2 | Set or cleared by OS write to config register. Set by user write to leaf register. Cleared by fanout of completed barrier. |
| Leaf Fanin | 1 per context | 2 | Set when last leaf joins (by user write or configuration). Cleared when chosen by "Transmit" machine. Cleared by any OS write to config register. |
| Child | 8 per context | 2 | Set by fanin packet from child. Cleared when chosen by "Transmit" machine. Cleared by any OS write to config register. |
| Parent Fanout | 1 per context | 2 | Set when fanout packet received by parent port or, in the case of a root, all children and leaves join. Cleared when chosen by "Transmit" machine. Cleared by any OS write to config register. |
| Transmit | 1 | multiple | Set when a barrier fanin/fanout is chosen to be transmitted. Cleared when the local block indicates the transmission is finishing up. |

The race-condition problem is resolved by looking at the sequence numbers. Table 5 enumerates the possible sequence number scenarios and how they should be interpreted.

TABLE 5

Sequence-Number Resolution

| Leaves | Sequence Numbers | Description |
|---|---|---|
| all clear | all same | previous barriers, if any, complete, all fanouts complete |
| all set | all same | barrier complete (although not yet fanned out) |
| all set | different | a first barrier complete on all leaves (although only partially fanned out); a second barrier already joined on others |
| some set & some clear | all same | barrier not complete |
| some set & some clear | sequence numbers for clears different than sequence numbers for sets | barrier complete on all leaves (although only partially fanned out) |
| some set & some clear | sequence numbers for clears and some sets different than sequence numbers for other sets | a first barrier complete on all leaves (although only partially fanned out); a second new barrier already joined on some |

Configuration

Barrier trees are constructed through nearest-neighbor connections. An example is shown in FIG. 8. The dark lines indicate the links that make up the barrier tree. A logical (i.e., unfolded) representation of this tree is shown in FIG. 9. These connections are set up via the configuration register as shown in FIG. 10. This register has a read/write address, as well as an alias that clears upon read. This is to allow more efficient deconfiguration, as vector packets are very slow. Two of the ports are capable of supporting leaf operation, as well as child operation. Note that a given port cannot be configured as both a child and a leaf. Attempts to configure it as such will result in the child-select bit being ignored. TABLE 6, TABLE 7, and TABLE 8 give descriptions of the fields in this register.

TABLE 6

Encoding of Barrier Parent Port Field

| Parent Port | Encoding (hex) |
|---|---|
| none (i.e., this is the root) | 0 |
| A | 1 |
| B | 2 |
| C | 3 |
| D | 4 |
| E | 5 |
| F | 6 |
| G | 7 |
| H | 8 |

TABLE 7

Assignment of Barrier Child Port Field Bits

| Child Port | ChildSel Bit |
|---|---|
| A | 0 |
| B | 1 |
| C | 2 |
| D | 3 |
| E | 4 |
| F | 5 |

TABLE 7-continued

Assignment of Barrier Child Port Field Bits

| Child Port | ChildSel Bit |
|---|---|
| G | 6 |
| H | 7 |

TABLE 8

Assignment of Leaf Bits

| Port | Source Bit | LeafSel/ LeafState Bit |
|---|---|---|
| B | 0 | 0 |
| B | 1 | 1 |
| A | 0 | 2 |
| A | 1 | 3 |

Operation

The barrier mechanism is controlled by several state machines as described in TABLE 9. States can change by operating system (OS) writes, user writes, or router hardware that has sent or received certain barrier messages.

TABLE 9

Barrier State Machines

| State Machine Name | Quantity | States | Description |
|---|---|---|---|
| Sequence | 1 per context | 4 | Written by OS write to config register. Incremented when fanout packet received by parent. |
| Leaf | 4 per context | 2 | Set or cleared by OS write to config register. Set by user write to leaf register. Cleared by fanout of completed barrier. |
| Leaf Fanin | 1 per context | 2 | Set when last leaf joins (by user write or configuration). Cleared when chosen by "Transmit" machine. Cleared by any OS write to config register. |
| Child Fanin | 8 per context | 2 | Set by fanin packet from child. Cleared when chosen by "Transmit" machine. Cleared by any OS write to config register. |
| Parent Fanout | 1 per context | 2 | Set when fanout packet received by parent port or, in the case of a root, all children and leaves join. Cleared when chosen by Transmit machine. Cleared by any OS write to config register |
| Transmit | 1 | multiple | Set when a barrier fanin/fanout is chosen to be transmitted. Cleared when the local block indicates the transmission is finishing up. |

The router sees user access to barrier leaf registers as local block writes with a barrier "Cmd" field. The router sees fanin/fanout traffic as single micropacket units with sideband that indicates a barrier command message. In one embodiment, each micropacket is 128 bits plus 8 bits of sideband.

Barrier Micropackets

The barrier header is similar to the message header except barrier select and barrier mode bits are substituted in the address field. The Barrier Mode bit (M) is byte address bit 19 which is header bit 47. The Barrier-Select bits (BSel) are byte address bits 18:14 which are header bits 46:42.

TABLE 11A

Network Barrier Packet -- NET_BAR

| 63 | | 47 | 46 | 42 | 37 | 35 | | 27 | | 13 | 9 | 2 | 1 | 0 |
|----|----|----|----|----|----|----|----|----|----|----|---|---|---|---|
| Addr(35:10) | | | | | PX | Cmd(7:0) | | Dest(13:0) | | Dir | Age | A | | V |
| | M | B Sel | | | | | | | | | | | | |
| F0 | Addr(49:36) | | | | Addr(9:0) | | | Source(15:0) | | | Source(15:0) | | | |
| 63 | 55 | | | 41 | | | | 31 | | | 15 | | | 0 |

TABLE 11B

User Write Request Packet -- NET_PWRB and
User Read Reply Packet -- NET_PRPLY

| 63 | | 37 | 35 | | 27 | | 13 | 9 | 21 | | 0 |
|----|----|----|----|----|----|----|----|---|----|----|---|
| Addr(35:10) | | PX | Cmd(7:0) | | Dest(13:0) | | Dir | Age | A | | V |
| F0 | Addr(49:36) | | Addr(9:0) | | Source(15:0) | | | Source(15:0) | | | |
| 63 | 55 | | 41 | | 31 | | | 15 | | | 0 |
| 63 | | | | | | | | | | | 0 |
| Unused(63:0) | | | | | | | | | | | |
| Unused(63:1) | | | | | | | | | | | B |
| 63 | | | | | | | | | | | 0 |

TABLE 11C

User Read Request Packet -- NET_PRDB and
User Write Reply Packet -- NET_PACK

| 63 | | 37 | 35 | | 27 | | 13 | 9 | 21 | | 0 |
|----|----|----|----|----|----|----|----|---|----|----|---|
| Addr(35:10) | | PX | Cmd(7:0) | | Dest(13:0) | | Dir | Age | A | | V |
| F0 | Addr(49:36) | | Addr(9:0) | | Source(15:0) | | | Source(15:0) | | | |
| 63 | 55 | | 41 | | 31 | | | 15 | | | |

Vector Routing

The vector-routing protocol is limited to 16 hops in the SN0 router, so a modified protocol is being adapted for the SN1 systems of the present invention.

SN1_Net provides the same Barrier Sel functions as the SN0 vector router messages, but the protocol has been modified to allow up to 42 hops.

The vector routing function allows software to probe the network topology and set up routing tables and ID fields through uncached reads and writes. Once the software programs a vector route in the hub-vector-route register, it may execute uncached reads and writes which initiate vector-route packets.

SN1 vector-route messages are always 3 micropackets in length. The first micropacket is a standard header, with the command encoding indicating read or write, and the direction field indicating router core (binary 000). Whenever a vector-route header enters a router chip, it is routed directly to the router Lock block. Once inside the router Local block, the second micropacket is examined for the vector route data. Vector route data consists of a 64-bit vector. Each vector element is made up of a 4-bit direction pointer. Direction pointers may contain either an output port direction or a vector terminator (binary 0000, or core destination). At each hop during the request phase of the vector route, the router core examines the current vector and routes according to the right-most direction field. The entire route vector is then shifted right by 4 bits, simultaneously shifting in a 4-bit number representing the return direction as the most-significant 4 bits (MSB).

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
   a plurality of routers, including a first router;
   a communications network, wherein the communications network connects to each one of the plurality of routers; and
   a synchronization domain coupled to the communications network, the synchronization domain comprising:
      synchronization messaging apparatus that sends and receives synchronization messages across the communications network between pairs of the plurality of routers, wherein the synchronization messages include a barrier-join message and a barrier-complete message; and
      for each one of the plurality of routers, a synchronization state register, wherein the synchronization state register for the first router stores an indication of one of a plurality of synchronization states and a sequence value that is changed upon a changing of a synchronization state.

2. The system according to claim 1, wherein the synchronization messages further comprise a eureka message.

3. The system according to claim 1, further comprising:
   a first synchronization state changer coupled to the synchronization state register and to the synchronization messaging circuit of the first router, and responsive to a synchronization state stored in the first synchronization state register and to a synchronization message received by the first synchronization messaging circuit, to change a synchronization state and a sequence value.

4. A computer system comprising:
   a plurality of routers, including a first router;
   a communications network, wherein the communications network connects to each one of the plurality of routers; and
   a synchronization domain coupled to the communications network, the synchronization domain comprising:
      synchronization messaging apparatus that sends and receives synchronization messages across the communications network between pairs of the plurality of routers, wherein the synchronization messages include a barrier-join message and a barrier-complete message; and
      for each one of the plurality of routers, a synchronization state register wherein the synchronization state register for the first router stores an indication of one of a plurality of synchronization states and a sequence value that is changed upon a changing of a synchronization state,
   the synchronization domain further comprising a first portion of the synchronization domain for the first router, the first portion of the synchronization domain comprising:

a first plurality of node interconnection ports for the first router, wherein the first plurality of node interconnection ports is operable to connect the first router to a plurality of other routers;

a synchronization-child-connection (SCC) register coupled to the first plurality of node interconnection ports, wherein the SCC register specifies which ones of the plurality of routers are children of the first node router; and a synchronization parent connection (SPC) register coupled to the first plurality of node interconnection ports, wherein the SPC register specifies which one of the plurality of routers is a parent of the first router.

5. A first node router for use in a multiprocessor computer system having a plurality of other node routers, the first node router comprising:

a first plurality of node interconnection ports, each operable to connect the first node router to the plurality of other node routers;

a first synchronization messaging circuit coupled to the first plurality of node interconnection ports, wherein the first synchronization messaging circuit selectively sends and receives synchronization messages between the first node router and the plurality of other node routers, wherein the synchronization messages include a barrier-join message and a barrier-complete message;

a first synchronization state register coupled to the first synchronization messaging circuit, wherein the first synchronization state register for the first router stores an indication of one of a plurality of synchronization states and a sequence value that is changed to indicate a changing of a synchronization state; and a first synchronization state changer coupled to the first synchronization state register and to the first synchronization messaging circuit, and responsive to a synchronization state stored in the first synchronization state register and to a synchronization message received by the first synchronization messaging circuit.

6. The first node router according to claim 5, further comprising:

a first synchronization child connection (SCC) register coupled to the first synchronization messaging circuit, wherein the first SCC register specifies which ones of the plurality of other node routers are children of the first node router; and a first synchronization parent connection (SPC) register coupled to the first synchronization messaging circuit, wherein the first SPC register specifies which one of the plurality of other node routers is a parent of the first node router.

7. A first node router for use in a multiprocessor computer system having a plurality of other node routers, the first node router comprising a first plurality of node interconnection ports, each operable to connect the first node router to the plurality of other node routers;

a first synchronization messaging circuit coupled to the first plurality of node interconnection ports, wherein the first synchronization messaging circuit selectively sends and receive synchronization messages between the first node router and the plurality of other node routers, wherein the synchronization messages include a barrier-join message and a barrier-complete message;

a first synchronization state register coupled to the first synchronization messaging circuit, wherein the first synchronization state register for the first router stores an indication of one of a plurality of synchronization states and a sequence value that is changed to indicate a changing of a synchronization state;

a first synchronization state changer coupled to the first synchronization state register and to the first synchronization messaging circuit, and responsive to a synchronization state stored in the first synchronization state register and to a synchronization message received by the first synchronization messaging circuit;

a first synchronization child connection (SCC) register coupled to the first synchronization messaging circuit, wherein the first SCC register specifies which ones of the plurality of other node routers are children of the first node router; and a first synchronization parent connection (SPC) register coupled to the first synchronization messaging circuit, wherein the first SPC register specifies which one of the plurality of other node routers is a parent of the first node router.

8. A massively parallel processor system comprising:

a virtual synchronization network (VSN) running on a physical data-communication network, the physical data-communication network coupling a plurality of processor entities (PEs) including a memory, a first PE, and a plurality of other PEs, the VSN comprising:

a synchronization messaging apparatus that sends and receives synchronization messages on the physical data-communication network between the first PE and the plurality of other PEs, wherein the synchronization messages comprise a barrier-join message; and a synchronization state changing apparatus that, responsive to a synchronization state and to a synchronization message received by the synchronization messaging apparatus, changes the synchronization state.

9. The system according to claim 8, wherein the synchronization messages further comprise a eureka message.

10. The system according to claim 8, wherein the synchronization messages further comprise a barrier-complete message.

11. The system according to claim 10, wherein the synchronization messages further comprise a eureka message.

12. The system according to claim 11, further comprising:

a synchronization state storage apparatus, wherein the synchronization state is stored in the synchronization state storage apparatus.

13. The system according to claim 11, further comprising:

synchronization child-connection storage means for specifying which ones of the plurality of other PEs are children of the first PE; and synchronization parent-connection register means for specifying which one of the plurality of other node routers is a parent of the first PE.

14. The system according to claim 8, further comprising:

a synchronization state storage apparatus, wherein the synchronization state is stored in the synchronization state storage apparatus.

15. The system according to claim 14, wherein the synchronization state storage means stores a synchronization state for each of a plurality of synchronization domains.

16. The system according to claim 8, further comprising:

synchronization child-connection storage means for specifying which ones of the plurality of other PEs are children of the first PE; and synchronization parent-connection register means for specifying which one of the plurality of other node routers is a parent of the first PE.

17. A massively parallel processor system comprising:
a virtual synchronization network (VSN) running on a physical data-communication network, the physical data-communication network coupling a plurality of processor entities (PEs) including a memory, a first PE, and a plurality of other PEs, the VSN comprising:
  a synchronization messaging apparatus that sends and receives synchronization messages on the physical data-communication network between the first PE and the plurality of other PEs, wherein the synchronization messages comprise a barrier-join message; and
  a synchronization state changing apparatus that, responsive to a synchronization state and to a synchronization message received by the synchronization messaging apparatus, changes the synchronization state; and
further comprising:
  synchronization child-connection storage means for specifying which ones of the plurality of other PEs are children of the first PE; and
  synchronization parent-connection register means for specifying which one of the plurality of other node routers is a parent of the first PE.

18. A massively parallel processor system comprising:
a virtual synchronization network (VSN) running on a physical data-communication network, the physical data-communication network coupling a plurality of processor entities (PEs) including a memory, a first PE, and a plurality of other PEs, the VSN comprising:
  a synchronization messaging apparatus that sends and receives synchronization messages on the physical data-communication network between the first PE and the plurality of other PEs, wherein the synchronization messages comprise a barrier-join message; and
  a synchronization state changing apparatus that, responsive to a synchronization state and to a synchronization message received by the synchronization messaging apparatus, changes the synchronization state
wherein the synchronization messages further comprise a barrier-complete message;
wherein the synchronization messages further comprise a eureka message; and
further comprising:
  synchronization child-connection storage means for specifying which ones of the plurality of other PEs are children of the first PE; and
  synchronization parent-connection register means for specifying which one of the plurality of other node routers is a parent of the first PE.

19. A massively parallel processor system comprising:
a virtual synchronization network (VSN) running on a physical data-communication network, the physical data-communication network coupling a plurality of processor entities (PEs) including a memory, a first PE, and a plurality of other PEs, the VSN comprising:
  a synchronization messaging apparatus that sends and receives synchronization messages on the physical data-communication network between the first PE and the plurality of other PEs, wherein the synchronization messages comprise a barrier-join message; and
  a synchronization state changing apparatus that, responsive to a synchronization state and to a synchronization message received by the synchronization messaging apparatus, changes the synchronization state
wherein the synchronization messages further comprise a barrier-complete message;
wherein the synchronization messages further comprise a eureka message; and
further comprising:
  a synchronization state storage apparatus, wherein the synchronization state is stored in the synchronization state storage apparatus;
  synchronization child-connection storage means for specifying which ones of the plurality of other PEs are children of the first PE; and
  synchronization parent-connection register means for specifying which one of the plurality of other node routers is a parent of the first PE.

20. A method for synchronizing barrier and eureka events in a computer system having a physical data-communication network, the physical data-communication network connected to a plurality of processor entities (PEs) including a first PE and a plurality of other PEs, comprising the steps of:
  receiving synchronization messages on the physical data-communication network to the first PE from a first subset of the plurality of other PEs;
  sending synchronization messages on the physical data-communication network from the first PE to a second subset of the plurality of other PEs;
  storing a synchronization state for the first PE; and
  changing the synchronization state responsive to the synchronization state and to a received synchronization message, and wherein the synchronization messages comprise a barrier-join message.

21. The method according to claim 20, wherein the synchronization messages further comprise a eureka message.

22. The method according to claim 20, wherein the synchronization messages further comprise a barrier-complete message.

23. The method according to claim 20 further comprising the steps of:
  keeping a children value indicative of the first subset of the plurality of other PEs which are children of the first PE; and
  keeping a parent value indicative of the second subset of the plurality of other PEs which is a parent of the first PE, and wherein:
    the step of receiving synchronization messages depends on the children value, and
    the step of sending synchronization messages depends on the parent value.

24. A method for synchronizing barrier and eureka events in a computer system having a physical data-communication network, the physical data-communication network connected to a plurality of processor entities (PEs) including a first PE and a plurality of other PEs, comprising the steps of:
  receiving synchronization messages on the physical data-communication network to the first PE from a first subset of the plurality of other PEs;
  sending synchronization messages on the physical data-communication network from the first PE to a second subset of the plurality of other PEs;
  storing a synchronization state for the first PE; and
  changing the synchronization state responsive to the synchronization state and to a received synchronization message, and wherein the synchronization messages comprise a barrier-join message, further comprising the steps of:

keeping a children value indicative of the first subset of the plurality of other PEs which are children of the first PE; and keeping a parent value indicative of the second subset of the plurality of other PEs which is a parent of the first PE, and wherein:

the step of receiving synchronization messages depends on the children value, and the step of sending synchronization messages depends on the parent value.

25. A node for use in a multiprocessor network, the node comprising:

a router, the router having a plurality of ports;

a plurality of processor entities (PEs) coupled to the router; and a synchronization configuration register (SCR), the SCR including an indication of which of the ports if any are connected to child nodes, an indication of which of the ports if any is connected to a parent node, and an indication of which of the PEs are connected as leaves of a barrier tree.

26. The node according to claim 25, further comprising:

a synchronization state register (SCR), the SSR including an indication of a barrier sequence state, the barrier sequence state changing when a barrier completes or starts or both.

27. The node according to claim 26, the SCR further comprising:

an indication of which of the PEs connected as leaves of a barrier tree have completed a barrier.

28. A node for use in a multiprocessor network, the node comprising:

a router, the router having a plurality of ports;

a plurality of processor entities (PEs) coupled to the router; and a synchronization configuration register (SCR), the SCR including an indication of which of the ports if any are connected to child nodes, an indication of which of the ports if any is connected to a parent node, and an indication of how many of the PEs coupled to the router are connected as leaves of a barrier tree.

29. The node according to claim 28, further comprising:

a synchronization state register (SCR), the SSR including an indication of a barrier sequence state, the barrier sequence state changing when a barrier completes or starts or both.

30. The node according to claim 29, the SCR further comprising:

an indication of how many of the PEs connected as leaves of a barrier tree have completed a barrier.

31. The computer system according to claim 1, the synchronization domain further comprising a first portion of the synchronization domain for the first router, the first portion of the synchronization domain comprising:

a first plurality of node interconnection ports for the first router, wherein the first plurality of node interconnection ports is operable to connect the first router to a plurality of other routers;

a synchronization-child-connection (SCC) register coupled to the first plurality of node interconnection ports, wherein the SCC register specifies which ones of the plurality of routers are children of the first node router; and a synchronization parent connection (SPC) register coupled to the first plurality of node interconnection ports, wherein the SPC register specifies which one of the plurality of routers is a parent of the first router.

32. The system according to claim 12, further comprising:

synchronization child-connection storage means for specifying which ones of the plurality of other PEs are children of the first PE; and synchronization parent-connection register means for specifying which one of the plurality of other node routers is a parent of the first PE.

33. A method for synchronizing synchronization-message events in a computer system having a data-communication network, the physical data-communication network connected to a plurality of processor entities (PEs) including a first PE and a plurality of other PEs, comprising the steps of:

receiving synchronization messages on the data-communication network to the first PE from a first subset of the plurality of other PEs;

sending synchronization messages on the data-communication network from the first PE to a second subset of the plurality of other PEs;

storing a synchronization sequence state for the first PE; and changing the synchronization sequence state responsive to a received synchronization message, wherein the synchronization messages comprise a barrier-join message and a barrier-complete message.

34. A computer system comprising:

a plurality of processors, including a first processor;

a communications network, wherein the communications network connects to each one of the plurality of processors; and a synchronization domain coupled to the communications network, the synchronization domain comprising:

synchronization messaging apparatus that sends and receives synchronization messages across the communications network between pairs of the plurality of processors, wherein the synchronization messages include a barrier-join message and a barrier-complete message; and for each one of the plurality of processors, a synchronization state register, wherein the synchronization state register for the first processor stores an indication of one of a plurality of synchronization states and a sequence value that is changed upon notification of a changing of a synchronization state.

* * * * *